United States Patent
Baker

(10) Patent No.: US 8,302,406 B2
(45) Date of Patent: Nov. 6, 2012

(54) FUEL DELIVERY AND CONTROL SYSTEM INCLUDING A POSITIVE DISPLACEMENT ACTUATION PUMP WITH A VARIABLE PRESSURE REGULATOR SUPPLEMENTING A FIXED DISPLACEMENT MAIN FUEL PUMP

(75) Inventor: Carthel C. Baker, Oregon, IL (US)

(73) Assignee: Woodward, Inc., Fort Collins, CO (US)

( * ) Notice: Subject to any disclaimer, the term of this patent is extended or adjusted under 35 U.S.C. 154(b) by 805 days.

(21) Appl. No.: 12/251,930

(22) Filed: Oct. 15, 2008

(65) Prior Publication Data

US 2010/0089025 A1    Apr. 15, 2010

(51) Int. Cl.
*F02C 1/00* (2006.01)

(52) U.S. Cl. ........... 60/772; 60/39.281; 60/235; 60/243; 60/734; 137/563; 137/565.33; 417/286; 417/287

(58) Field of Classification Search .............. 60/39.281, 60/734, 773; 137/565.33; 417/426–428
See application file for complete search history.

(56) References Cited

U.S. PATENT DOCUMENTS

| 3,801,228 A * | 4/1974 | Mueller .................... 60/39.281 |
| 4,245,964 A | 1/1981 | Rannenberg |
| 4,429,528 A | 2/1984 | Matthews et al. |
| 4,591,317 A | 5/1986 | Markunas |
| 4,805,658 A * | 2/1989 | Perkinson et al. ......... 60/39.281 |
| 5,110,269 A | 5/1992 | Fallon |
| 5,116,362 A | 5/1992 | Arline et al. |
| 5,806,300 A | 9/1998 | Veilleux, Jr. et al. |
| 5,918,573 A | 7/1999 | Killion |
| 6,487,847 B1 * | 12/2002 | Snow et al. .................... 60/764 |
| 6,651,441 B2 | 11/2003 | Reuter et al. |
| 7,185,485 B2 * | 3/2007 | Lewis .............................. 60/764 |
| 2005/0016176 A1 * | 1/2005 | Griffiths et al. ................. 60/734 |
| 2005/0050897 A1 | 3/2005 | Lewis |
| 2005/0217236 A1 | 10/2005 | Wernberg et al. |
| 2006/0266047 A1 | 11/2006 | Eick et al. |
| 2007/0199301 A1 | 8/2007 | Shelby et al. |
| 2008/0289338 A1 | 11/2008 | Desai |

FOREIGN PATENT DOCUMENTS

| EP | 0 474 585 A1 | 3/1992 |
| EP | 0 657 651 A1 | 6/1995 |
| EP | 1 662 117 A2 | 5/2006 |
| WO | WO 2007/044020 A2 | 4/2007 |

OTHER PUBLICATIONS

U.S. Appl. No. 12/252,006, filed Oct. 15, 2008, Baker et al.

* cited by examiner

*Primary Examiner* — Ehud Gartenberg
*Assistant Examiner* — Lorne Meade
(74) *Attorney, Agent, or Firm* — Reinhart Boerner Van Deuren P.C.

(57) ABSTRACT

A fuel delivery and control system is provided including a dual pump fluid circuit configuration comprising a fixed positive displacement pump sized to supply the main engine burn flow ranging from above windmill through cruise, a positive displacement actuation pump including a variable pressure regulator, wherein the actuation pump is sized to supply fluid to engine actuators, valves and other hydraulically operated engine components and a pump flow sharing system interconnecting the two pumps. The combined flow from the two pumps is sufficient to meet the engine flow demand for windmill relight and maximum flow conditions. During cruise or normal operating conditions, the pumps operate in completely isolated flow circuits, minimizing recirculation and therefore heat input into the fuel supply system.

15 Claims, 1 Drawing Sheet

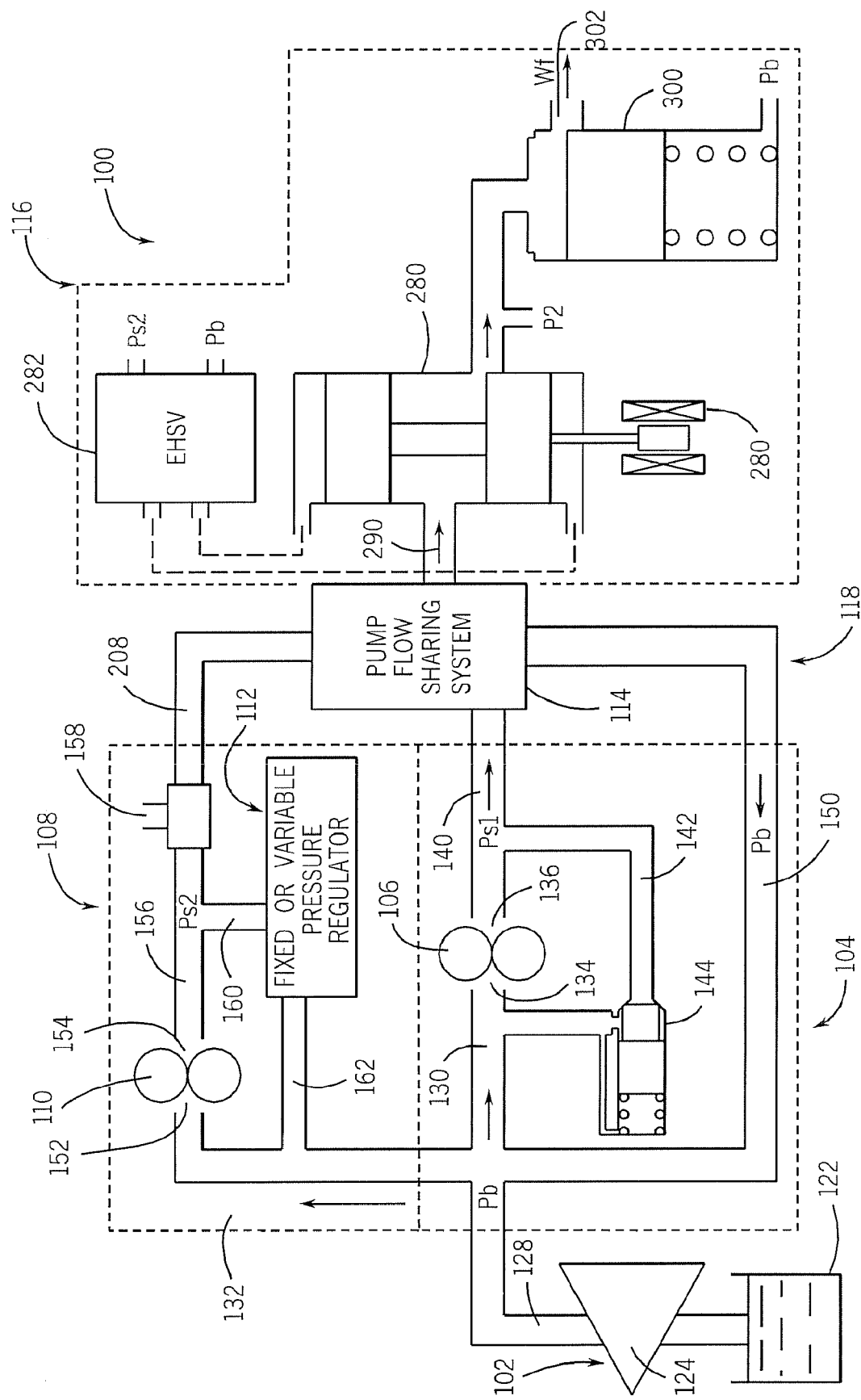

FUEL DELIVERY AND CONTROL SYSTEM INCLUDING A POSITIVE DISPLACEMENT ACTUATION PUMP WITH A VARIABLE PRESSURE REGULATOR SUPPLEMENTING A FIXED DISPLACEMENT MAIN FUEL PUMP

FIELD OF THE INVENTION

This invention pertains to fuel delivery system for gas turbine engine applications, and more particularly to a thermally efficient, dual pump fuel delivery and control system.

BACKGROUND OF THE INVENTION

In aviation applications, fuel delivery systems for gas turbine engines typically utilize high pressure, positive displacement pumps to supply high pressure fuel to the engines which power the aircraft. In addition, the high pressure fuel system is often utilized as a source of high pressure fluid for the hydraulic systems and servos which position actuators that control the engine or other aspects of the aircraft.

The fuel pump is typically driven by the turbine engine through a gearbox. The pump flow rate is thus proportional to engine speed. The main fuel supply pump is sized to supply enough fuel to the engine during windmill start conditions, which are typically about 6 to 10% of normal cruising speed, and/or during maximum power conditions. Accordingly, at many engine operating conditions, the engine flow demand is significantly less than the high pressure flow supplied by the main pump. The excess high pressure pump flow is typically bypassed back to the low pressure inlet of the pump. Raising the pressure of the excess flow and returning the excess flow back to low pressure is effectively wasted energy. This energy is realized as heat input into the fuel and results in undesirable higher fuel temperatures.

Accordingly, it would be desirable to provide a fuel delivery and control system for gas turbine engine applications that minimizes the amount of fuel flow in excess of engine fuel flow demand that is raised to high pressure, thus reducing the waste heat energy input to the fuel by the pump. These and other advantages of the invention, as well as additional inventive features, will be apparent from the description of the invention provided herein.

BRIEF SUMMARY OF THE INVENTION

The present invention provides a dual pump, flow sharing fuel delivery and control system providing a fluid circuit arrangement that permits each system pump to be sized for a given flow allocation, allowing combined pump flow at high engine demand requirements, such as windmill starts and other maximum flow demand conditions, and allowing each pump fluid circuit to be isolated from each other.

As such, in certain preferred embodiments of the present invention, a main fuel supply pump, such as a fixed delivery, positive displacement pump, is provided and sized to supply fuel at cruise burn flow conditions (Wf). In this manner, the main pump is a smaller pump compared to those used in prior art systems, with minimal bypass flow at critical thermal conditions. A second, fixed delivery positive displacement, actuation pump preferably includes a variable pressure regulator, and is sized to supply actuation, leakages, and cooling flows and supplements the main positive displacement pump that supplies engine burn flow. The actuation pump is preferably sized to provide sufficient pressure to supply the engine functions and includes a variable pressure regulator to maintain the lowest possible differential pressure (delta P) across the pump and within the actuation system of the engine during all engine conditions.

The high pressure outlets of the main fuel supply pump and the actuation pump are interconnected by a flow sharing system that integrates the flow from the actuation pump to meet engine fuel demand when it exceeds the flow that is provided by the main pump. In certain preferred embodiments of the present invention, the main pump supplies approximately about 20% of the combined flow capacity of the system, with the actuation pump supplying approximately about 80% of the combined flow capacity of the system. Dividing the flow in this manner, and providing a flow sharing means to control and isolate each of the pump fluid circuits, allows the differential pressure across the larger actuation pump to be minimized and therefore leads to a significant reduction in the amount of fuel flow in excess of engine fuel flow demand that is pressurized and then recirculated back to its lower pressure inlet, thus reducing the waste heat energy input to the fuel by the actuation pump. Further, by configuring the pumps in this manner, it will be appreciated that the actuation pump can be operated at a lower discharge pressure during engine steady state conditions, compared to that required by the main supply pump, further enhancing the thermal benefit of the fuel system of the present invention.

Accordingly, the present invention provides, at least in part, a reduction of heat input from the pumping system at critical fuel system thermal conditions by lowering the differential pressure across the large actuation pump to the minimum pressure needed to support the actuators and servo functions during steady state conditions. In combination with a variable pressure regulator, the pressure supplied by the actuation pump can be increased when higher pressure is needed to position the actuators and then it can be lowered again to reduce the load on the pump reducing the heat generated.

The present invention further provides, in part, a system including a main fuel supply pump that supplies substantially no actuation and electrohydraulic servo-valve flow. Accordingly, the fuel metering unit (FMU) discharge pressurizing valve no longer needs to be sized to maintain the minimum differential pressure required to operate the actuators and EHSVs. Lowering the FMU discharge pressurizing valve setting results in a lower delta P across the main, fixed displacement pump when operating on the FMU discharge pressurizing valve. The lower delta P across the main pump results in an additional reduction in the amount of waste heat generated at these conditions.

In addition, the pressure required to operate the engine actuators varies with operating conditions and is typically significantly lower for steady state conditions than for actuation transients. Accordingly, the fixed displacement actuation pump includes a variable pressure regulator that allows the pump delta P to be varied so that the minimum delta P required to operate the actuators and electrohydraulic servo-valves (EHSVs) can be maintained across the pump. The ability to maintain a lower delta P across the actuation pump significantly reduces the amount of waste heat generated by the pumping system.

Furthermore, the variable pressure regulator can be used to increase delta P across the actuation pump, and therefore, can be used to increase temperature within the actuation system for cold starts when fuel temperatures are below freezing. This feature may allow the servo heat-exchanger to be eliminated from the fuel system.

For operating conditions with engine burn flow (Wf) demand from approximately windmill start through cruise, the high pressure discharges of the two pumps are completely isolated from each other. It will be appreciated that the majority of the engine operating time is spent at these conditions. Completely isolating the actuation supply from the Wf supply for most engine operating conditions eliminates the influence of actuation transients on Wf for those conditions.

It will be appreciated that the present invention provides, at least in part, a flow sharing feature that allows the sizing of each of the two pumps to be kept to the minimum. In the absence of flow sharing, the two pumps are typically sized at different operating conditions, which leads to larger pumps and poor thermal performance.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a schematic representation of an aircraft engine fuel system constructed in accordance with one aspect of the present invention, showing a main positive pump supplemented by a fixed displacement actuation pump in combination with a variable or fixed pressure regulator;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An exemplary embodiment of a fuel delivery and control system 100 of the present invention is illustrated in FIG. 1. The fuel delivery and control system 100 includes, in its simplest form, a fuel supply, indicated generally at 102, a main fuel supply loop, indicated generally at 104, including a positive displacement pump 106 for providing fuel to the engine during normal or steady state operating conditions, an actuation supply loop, indicated generally at 108, including a positive displacement, actuation pump 110 with a pressure regulator assembly 112, that supplies hydraulic fuel to engine components, and a pump flow sharing system, indicated generally at 114 fluidly connecting the main supply loop 104 and the actuation loop 108 to integrate/combine pump flows when required by engine demands. The fuel system further includes a fuel metering unit (FMU), indicated generally at 116, for metering fuel to the turbine engine and fuel bypass 118. It will be understood that FIG. 1 is a schematic representation of the present invention and illustrates only one example of the configuration of the system 100, which can be implemented in any number of ways, as will be known to those skilled in the art.

As shown in FIG. 1, the fuel supply 102 preferably includes a fuel tank 122 and a boost pump 124. The boost pump 124 generates a low pressure source Pb that is supplied to the fuel delivery system via conduit or line 128, which further splits into lines 130 and 132 to supply both the main pump 106 and the actuation pump 110 with fuel. The boost pump 124 can be, for example, a centrifugal pump to provide fuel at a sufficient pressure to the inlet of each of the main pump 106 and actuation pump 110, as will be well known to those skilled in the art. It will be appreciated that the lines 128, 130 and/or 132 may each include at least one check valve and/or fuel filter (not shown), as will be well known to those in the art.

The main engine fuel supply loop 104 includes the low pressure, Pb, fuel supply line 130 in fluid communication with an inlet 134 of the main fuel supply, positive displacement pump 106 (hereinafter "the main pump 106"). Fuel at a pressure indicated as Ps1 exits at an outlet 136 of the main pump through high pressure outlet line 140 and delivers fuel at the required flow rate to fuel metering unit 116 to meet the required engine burn flow demands. A relief line 142 including a high pressure relief valve (HPRV) 144 is also provided to control the maximum pressure supplied to the fuel metering unit 116. A recirculation or bypass line, indicated at 150 is provided for recirculating fluid flow back to the low pressure, input end of the main pump 106. The recirculation bypass line can include a bypass valve (not shown) as will be appreciated by those skilled in the art.

The main pump 106 is preferably sufficiently sized to meet engine burn flow (Wf) demands ranging from above windmill through the cruise conditions. Accordingly, it will be appreciated that since the main pump is sized to deliver fuel at a rate that more closely matches engine demand during steady state and/or most thermally critical conditions, the amount of high pressure bypass/recirculated flow is minimized. By sizing the main pump 106 in this manner, whereby the excess flow capacity needed for high fuel flow conditions has been shifted to the actuation pump and bypassed at low pressure within the actuation loop 108 until the flow is needed, less heat is generated within the main supply loop 104 during such steady state conditions. Further, as will be appreciated, the main pump 106 is of sufficient size to meet the pressure and flow requirements during these operating conditions, yet it need not be sized to solely generate the pressure required to meet windmill relight or high flow conditions and/or meet the pressure requirements for actuator flow. As such, the main positive displacement pump can be smaller in size, and thus of a lower weight than the main fuel supply pumps of conventional fuel flow systems.

In one embodiment, for example, the main pump 106 is sized to provide approximately about 20% of the combined pump flow capability while the actuation pump 110 provides approximately about 80% of the combined flow capability. As described in more detail below, the combined flow from the two pumps, indicated generally as number 290 in FIG. 1, is sufficient to meet the engine flow demand for windmill relight and maximum flow conditions required by the engine.

For certain other applications, the main pump 106 can be sized to supply engine burn flow Wf for windmill start and/or other conditions beyond cruise. For certain other applications, the main pump 106 can also be sized to supply flow for engine functions other than utilize fuel flow, such as providing flow to at least a portion of the engine's actuators, valves and other hydraulic systems, as will be appreciated by those skilled in the art. As such, the about 80/20 flow division between the two pumps is merely one example of the type of flow sharing or division contemplated by the present invention. Preferably, however, to minimize heat dissipation to the fuel stream, the actuation pump 110 of the fuel delivery and control system 100 is sized to provide a larger portion of the total engine flow demand during windmill relight and maximum flow conditions that of the main pump 106.

The actuation loop 108, in its simplest form, includes the low pressure, fuel supply line 132 in fluid communication with an inlet 152 of the positive displacement actuation pump 110 (hereinafter "the actuation pump 110"). Fuel at a pressure indicated as Ps2 exits at an outlet 154 of the actuation pump 110 through high pressure outlet line 156 and delivers fuel at the required pressure and flow rate to the engine actuator supply line 158. Although not shown, the actuator supply line 158 can incorporate a minimum pressure valve (AMPV), bypass valve, filters and the like, as will be appreciated by those skilled in the art. A bypass line 160 in fluid communication with the outlet 154 of the actuation pump 110 is provided and connects to the pressure regulator assembly 112. A second bypass line 162 is provided to direct bypass fuel back to the fuel supply line 132 on the low pressure side of the actuation pump 110. A line 208 connects the output end 154 of the actuation pump 110 to the pump flow sharing system 114 so that the flow may be selectively directed to the main engine supply line 290 when required.

It will be appreciated that the actuation pump 110 is preferably a positive displacement pump sufficiently sized to provide actuator steady state plus transient flow to assure positive operation of the actuators, leakage and servo flow. In addition, the actuator pump 110 is sized to supplement the main pump 106 to provide the necessary make-up flow to the engine during peak demand operating conditions. The actuation pump 110 is controlled to maintain a minimum discharge pressure Ps2 that is sufficient to meet the actuation system pressure demand. Such a pressure is achieved by utilizing the pressure regulator 112, which is preferably a variable pressure regulator, to adjust the discharge pressure Ps2 in accordance with the actuation system pressure requirements. As such, the actuation pump 110 can be controlled to the minimum discharge pressure Ps2 required for steady state engine conditions, when the main pump and actuation pumps are isolated from each other. The discharge pressure Ps2 can be readily increased or decreased when required by actuation system requirements.

It will be appreciated that because the actuation pump 110 no longer contributes to supplying fuel at a pressure required by the fuel nozzles/fuel metering system during steady state and/or thermally critical conditions, in isolated pumps mode, the actuation pump 110 discharge pressure Ps2 will be preferably lower than the discharge pressure Ps1 of the main pump 106. Such a minimum discharge pressure Ps2 is achieved by utilizing the pressure regulator 112 to adjust the pressure output of the actuation pump 110 in accordance with actuation system pressure requirements. In the isolated pumps mode, the variable pressure regulator 112 can be used to temporarily increase Ps2, to a pressure that may be temporarily higher than Ps1 at steady state conditions, when engine conditions required moving the actuators ("actuator transient conditions"). However, Ps2 is lowered back to the minimum required system pressure when the actuation system returns to steady state conditions. In certain embodiments of the present invention, the pressure regulator 112 can be used to increase the discharge pressure Ps2 and bypass flow from the actuation pump 110 can thus be used to increase fuel temperature for cold starts when fuel temperatures are below freezing.

Accordingly, the actuation pump 110 can be sized to supply approximately about 80% of the combine flow capability, or 80% of the peak or maximum fuel demand of the engine. It will be appreciated that the 80-20 flow division between the actuation and the main pump is presented as only one example of the type of flow sharing or flow balancing contemplated by the present invention. Indeed, the division of burn flow, leakage and cooling flow functions between pumps can vary depending on a given application.

The fuel metering unit (FMU) 116 includes a line 290 for supply flow to a fuel metering valve 280 set with a suitable servo-controller, such as a electrohydraulic servo-valve (EHSV), indicated generally at 282, which is in turn controlled by the full authority digital electronic controller (FADEC) (not shown). A pressurizing/shut-off valve 300 in fluid communication at the outlet of the fuel metering valve 280 (shown at pressure P2) is provided to regulate the pressure drop across the fuel metering valve 280. The valve 300 includes an outlet 302 for supplying fuel at engine burn demand flow rate (Wf) to the engine combustion system, and can be completely closed during engine shut down. Fuel in excess of engine demand can be recirculated back to the lower pressure inlet of the main pump 106 through the line 150.

Operation and control of the fluid delivery system 100 is described. In particular, the fuel delivery and control system 100 of the present invention includes an isolated pumps mode, wherein the main fuel supply loop 104 is isolated from the actuation loop 108. Preferably, the system 100 is in the isolated pumps mode during operating conditions with Wf demand from above windmill start through cruise conditions. The majority of the engine operating time is spent at these conditions. More specifically, during these conditions, the high pressure discharges of each of the pumps 106 and 110 are completely isolated from each other.

In the isolated pumps mode, the actuation supply loop 108 operates to supply fuel to the actuation system supply line 158 at the minimum required discharge pressure, Ps2, sufficient to operate the actuation system including leakages and cooling flows. In isolated pumps mode, this minimum required pressure will vary depending on engine operating mode, as will be known to those skilled in the art. The variable pressure regulator assembly 112 allows the actuation pump 110 delta P to be varied so that the minimum delta P required to operate the actuators and EHSVs can be maintained across the actuation pump 110 during these operating conditions. Alternatively, if a fixed pressure regulator 112 is used, the regulator is set to maintain the actuation pressure at the maximum pressure needed to supply the actuation system to minimize pump heat input. Maintaining a low delta P across the actuation pump 110 significantly reduces the amount of waste heat generated by the pumping system.

In the isolated pumps mode, the main supply loop 104 provides engine burn flow supply to the FMU 116. In this operational position, the flow sharing system 114 functions to permit only the output flow from the main supply pump 106 to the line 290 in communication with the FMU 116. As such, it will be appreciated that the pressure and flow in the line 290 is substantially the same as the discharge pressure Ps1 in line 140 and the flow rate in the line 290 is substantially equal to the flow in line 140 at the outlet of the main pump 106 minus a the bypass flow in line 150. As recited above, the main pump 106 is sized to deliver fuel at a rate that more closely matches engine demand, the amount of high pressure bypass/recirculated flow is minimized, as well as the heat generated thereby. Accordingly, during such steady state operating conditions with minimal recirculation, the main pump 106 can deliver a high discharge pressure Ps1 without significant thermal impact into the main fuel supply loop 104. Preferably, the steady state, predetermined discharge pressure Ps1 is higher than the discharge pressure Ps2 of the actuation pump 110.

As such, the main pump 106 is dedicated to supplying Wf. In particular, the high pressure flow is directed to the fuel metering unit 116 through lines 140 and 290. Additionally, because the main pump 106 supplies no actuation and EHSV flow, the FMU discharge pressurizing valve 300 can be reduced to a minimum size. Lowering the FMU discharge pressurizing valve 300 setting results in a lower main pump 106 delta P when operating on the FMU discharge pressurizing valve 300. The lower delta P results in an additional reduction in the amount of waste heat generated at these conditions.

During operating conditions with Wf demands from above cruise, at windmill relight or at other peak engine fuel demands, the fuel delivery and control system 100 of the present invention is in the shared pumps mode. When the engine Wf demand is expected to be greater than the flow capability of the main pump 106, flow sharing system 114 transitions from the two isolated pumps mode to the shared pumps mode. This allows flow from the pressure regulated, fixed actuation pump 110 to be used to supply or supplement the engine burn, Wf, demand.

When in the shared pump mode, the main pump 106 discharge pressure (Ps1) and actuation pump 110 discharge pressure (Ps2) are substantially equal. In shared pump mode, the maximum engine flow demand is met by the combined output flow from the actuation pump 110 and the main pump 106. The actuation pump 110 supplies a supplemental volume of flow as needed to augment the main pump 104, depending on the amount of flow demanded by the engine. As such, the pump flow sharing system 114 varies the amount of supplemental flow provided by the actuation pump 110. As such, excess pump flow from the actuation pump 110 will continue to recirculate through line 160 and the pressure regulator 112 and line 162. Also, any flow in excess of engine demand in the shared pumps mode can be bypassed back to the low pressure inlet side of the main pump 104 via the bypass system 118.

It will be appreciated that the present invention provides an actuation pump that supplements a main pump, wherein the flow sharing system allows the sizing of the two pumps to be kept to the minimum. Without flow sharing the two pumps would typically be sized at different operating condition which would lead to larger pumps and poor thermal performance. Without flow sharing the main pump is sized for takeoff flow. In one example of the present invention, the main pump 106 displacement is approximately about 1.1 Cl/rev. The actuation pump is sized for leakage at start and the displacement is approximately about 1.3 Cl/rev. With flow sharing, the combined displacement of the two pumps is about 1.45 Cl/rev.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel delivery and control system for a gas turbine engine having a maximum fuel flow requirement and a steady state requirement that is less than the maximum fuel flow requirement and also including a fuel metering unit, the fuel delivery and control system comprising:
   a fixed displacement actuation pump of a size limited to providing only a first portion of the maximum fuel flow requirement of the engine, the actuation pump having an inlet and an outlet;
   a variable pressure regulator in fluid communication with the outlet of the actuation pump, the variable regulator capable of adjusting the pressure drop across the inlet and the outlet of the actuation pump to maintain a minimum discharge pressure; and
   a fixed displacement main pump of a size limited to providing a second portion of the maximum fuel flow requirement of the engine, the second portion being less than the maximum fuel flow requirement of the engine, the main pump having an outlet in fluid communication with the fuel metering unit and in selective fluid communication with the outlet of the actuation pump, wherein the fuel delivery and control system is configurable between an isolated pumps mode wherein the outlets of each of the actuation pump and the main pump are separated from each other and a shared pumps mode wherein the outlets of each of the actuation pump and the main pump are in fluid communication with each other to combine the first portion of the maximum fuel flow of the engine with the second portion of the maximum fuel flow of the engine and wherein the combined flow is supplied to the fuel metering unit of the engine.

2. The fuel delivery and control system of claim 1, wherein the actuation pump is sized to provide fuel at a sufficient predetermined pressure and flow rate to a plurality of hydraulically actuated devices within the engine in addition to the first portion of the maximum fuel flow requirement.

3. The fuel delivery and control system of claim 1, wherein the main pump is configured to provide fuel to the fuel metering unit at a pressure that is greater than the discharge pressure of the actuation pump when the system is in the isolated pumps mode and the engine is operating at steady state conditions.

4. The fuel delivery and control system of claim 1, wherein the main pump is sized to provide substantially 20 percent of the maximum fuel flow requirement of the engine and the actuation pump is sized to provide substantially about 80 percent of the maximum fuel flow requirement of the engine.

5. The fuel delivery and control system of claim 1, further comprising a fuel bypass line in fluid communication with the fuel metering unit, the bypass line directing fuel back to the inlet of the main pump.

6. A fuel system for use in an aircraft engine having a maximum fuel flow demand, the fuel system comprising:
   a main fuel pump for pressurizing fuel from a fuel supply, the main fuel pump having an inlet and an outlet, the main fuel pump providing fuel to the engine at a predetermined flow rate and discharge pressure; and
   an actuation pump comprising a pressure regulator, the actuation pump having an inlet and an outlet, and capable of providing output fuel at a discharge pressure that is lower than the discharge pressure of the main pump, the outlet of the actuation pump in selective fluid communication with the outlet of the main pump, wherein the combined output flow from the main pump and the actuation pump is required in order to meet the maximum fuel demand of the engine.

7. The fuel system of claim 6, wherein a variable discharge pressure of the actuation pump is controlled to the minimum pressure sufficient to operate a plurality of hydraulically actuated devices within the engine.

8. The fuel system of claim 6, wherein the main fuel pump is sized to provide substantially 20 percent of the maximum fuel demand from the engine and the actuation pump is sized to provide substantially about 80 percent of the maximum fuel demand of the engine.

9. The fuel system of claim 6, further comprising a regulator valve assembly in communication with the actuation pump for controlling the pressure drop across the inlet and the outlet of the actuation pump.

10. The fuel system of claim 6, wherein the pressure regulator is a variable pressure regulator.

11. The fuel system of claim 6, further comprising a control valve in communication with the pressure regulator, the control valve configured for setting a pressure differential across the actuation pump.

12. The fuel system of claim 6, further comprising a pump flow sharing system selectively interconnecting the outlet of the main fuel pump and the outlet of the actuation pump when the engine burn flow fuel demand is greater than the flow rate of the main fuel pump.

13. A method of delivering fuel to an aircraft engine having a maximum fuel demand, the method comprising:
   providing a first pump sized for a limited supply of approximately 20% of the maximum fuel demand of the engine;
   providing a second pump having an outlet in selective fluid communication with an outlet of the first pump, the second pump providing approximately 80% of the maximum fuel demand of the engine; and
   alternating between an isolated pumps mode wherein the second pump provides fluid flow only to an actuation system and a servo system of the engine and a shared pumps mode wherein the outlets of the first and the second pumps are required to be combined provide the maximum fuel demand required by the engine.

14. The method of claim 13, wherein the second pump is a fixed displacement pump including a variable pressure regulator.

15. The method of claim 13, wherein the second pump is configured to supply a minimum discharge pressure sufficient to operate the actuation system and the servo system of the engine, the discharge pressure of the second pump being maintained lower than the first pump when the pumps are in the isolated pumps mode.

\* \* \* \* \*